United States Patent [19]
Lockhart et al.

[11] Patent Number: 5,261,944
[45] Date of Patent: Nov. 16, 1993

[54] NICKEL CERMET, AND PROCESS FOR PREPARING IT

[75] Inventors: Thomas P. Lockhart, Lodi; Giampietro Piro, Milan; Federica Gagliardi, Castellanza; Laura Zanibelli, Milan, all of Italy

[73] Assignees: Eniricerche S.p.A.; Snam, S.p.A., Milan, Italy

[21] Appl. No.: 898,036

[22] Filed: Jun. 12, 1992

[30] Foreign Application Priority Data

Jun. 28, 1991 [IT] Italy ............... MI91 A 001792

[51] Int. Cl.$^5$ .................................... C22C 29/00
[52] U.S. Cl. ................................. 75/628; 75/230
[58] Field of Search ........................... 75/628, 230

[56] References Cited

U.S. PATENT DOCUMENTS 3,300,344  1/1967  Bray et al. ................. 136/86

OTHER PUBLICATIONS

Karl V. Kordesch et al., Ullman's Encyclopedia of Industrial Chemistry, vol. A12, Ed. 1989, pp. 80–83.
Morphology and Electrochemistry of Porous Nickel/-Zirconia Cermets, at pp. 90–98 of Proceedings of the First International Symposium on Solid Oxide Fuel Cells, S. C. Singhal, Ed. 1989.
H. Arai, International Symposium on SOFC, Nov. 13–14, 1989, Nagoya, Japan pp. 288–292.

*Primary Examiner*—Peter D. Rosenberg
*Attorney, Agent, or Firm*—George P. Hoare, Jr.

[57] ABSTRACT

A nickel cermet contains 35–70% by weight of a metal nickel phase and 65–30% by weight of a zirconia phase stabilized in the cubic form with yttria, with, on X-ray diffraction analysis, said phases appearing as distinct and homogeneously distributed at a level lower than 1 μm.

This nickel cermet is obtained by preparing an aqueous solution containing a heat-decomposable zirconyl, yttrium and nickel salt, and an organic hydroxyacid or aminoacid, or a poly(acrylic acid); removing water from the resulting solution, under conditions of absence, or substantial absence, of decomposition phenomena, in order to separate a porous solid; calcining the porous solid, and reducing with hydrogen the product from calcination.

The nickel cermet obtained in this way is useful as an anodic material for a solid oxide fuel cell (SOFC).

12 Claims, No Drawings

NICKEL CERMET, AND PROCESS FOR PREPARING IT

The present invention relates to a nickel cermet, to the process for preparing it and to the use thereof as an anodic material for solid oxide fuel cells (SOFC).

Solid oxide fuel cells (SOFC) are known in the art, which use, as a solid electrolyte, a mixture of yttria ($Y_2O_3$ and zirconia ($ZrO_2$ an anode formed by a nickel/zirconia cermet and a lanthanum manganite ($LaMnO_3$) cathode. For a general description of such cells, reference is made to Ullmann's Encyclopedia of Industrial Chemistry, Vol. A12, Ed. 1989, pages 80-82 and to the references cited therein.

The nickel/zirconia cermet used as the anodic material is normally constituted by a dispersion of nickel metal in zirconia stabilized in the cubic crystal form with yttria.

The processes for preparing such a cermet essentially comprise mechanically dispersing nickel oxide throughout the stabilized zirconia, then reducing nickel oxide into nickel metal. So, e.g., according to the specification of U.S. Pat. No. 3,300,344; mixed zirconia and yttria, obtained by precipitation from an aqueous solution, are transformed into shaped bodies with the addition of nickel oxide and carbon powder, and the nickel oxide is reduced in order to yield nickel metal, owing to the effect of the carbon powder at high temperature.

Furthermore, in the paper: Morphology and Electrochemistry of Porous Nickel/Zirconia Cermets, at pages 90-98 of Proceedings of the First International Symposium on Solid Oxide Fuel Cells, S. C. Singhal, Ed. 1989, the reduction with hydrogen of a mixture of sintered powders obtained by co-milling, with a ball mill, nickel oxide and stabilized zirconia, is described. Other well-known techniques are those based on C.V.D. (chemical vapour deposition) and P.S. (plasma spraying) described, e.g., by H. Arai in International Symposium on SOFC, Nov. 13-14th, 1989, Nagoya, Japan.

The nickel cermets obtained by means of the processes known from the prior art are not completely satisfactory in the application to fuel cells, mainly due to their inability to supply nickel with a large enough active surface-area for offering interesting catalytic properties (A. L. Lee et al., Ind. Eng. Chem. Res., 1990, 29, 766-773).

Another problem derives from the difficulty of accomplishing a complete reduction of nickel oxide particles, into nickel metal. The paper by S. C. Singhal, cited hereinabove, reports in fact that particles with larger size than approximately 3 $\mu$m retain an NiO core after their reduction with hydrogen. On the other hand, as regards the C.V.D. and P.S. techniques, problems exist as to the quality of the resulting material and due to the difficulties to be faced when said techniques are applied to the construction of medium- and high-power cells. The present applicants have found, according to the present invention, a process which makes it possible for a solid material composed of nickel oxide and stabilized zirconia, as two distinct phases, with a phase distribution at a lower level than 1 $\mu$m, to be obtained.

It was furthermore found that nickel oxide contained in such a solid material can be reduced to a complete, or substantially complete, extent, by means of hydrogen, in order to yield a nickel cermet with a submicronic distribution of the phases and a large active nickel surface-area, so as to render the same cermet particularly suitable for use as material for solid oxide fuel cells (SOFC).

In accordance therewith, according to an aspect thereof, the present invention relates to a nickel cermet consisting of 35-70% by weight of a metal nickel phase and 65-30% by weight of a zirconia phase stabilized in the cubic form with yttria, with, on X-ray diffraction analysis, both said phases appearing as distinct and homogeneously distributed at a level lower than 1 $\mu$m, and said nickel cermet, when submitted to the hydrogen chemisorption test by means of the pulsed technique, showing a percent dispersion of nickel of from 0.2 to 2.0 and a specific surface-area comprised within the range of from 2 to 12 $m^2/g$ of nickel and of from 1 to 4 $m^2/g$ of cermet.

Such a nickel cermet usually displays a portion of its surface-area coated with nickel, which is comprised within the range of from 4 to 30%, or even more, of its total surface-area.

According to another aspect thereof, the present invention relates to a process for preparing a nickel cermet with the above reported characteristics, which process comprises the following steps:

(a) preparing an aqueous solution containing a water-soluble, heat-decomposable zirconyl, yttrium and nickel salt, and an organic hydroxyacid or aminoacid, or a poly(acrylic acid);

(b) removing water from the solution prepared in above step (a), in the absence, or in the substantial absence, of decomposition phenomena, in order to separate a porous solid material;

(c) calcining the porous solid separated in the step (b), under oxidizing conditions, in order to cause the formation of a solid material containing two distinct phases of nickel oxide, and of zirconia stabilized in the cubic form with yttria, with a phase distribution at a lower level than 1 $\mu$m; and (d) reducing the nickel oxide into nickel metal, inside the solid material obtained from the step (c), in order to obtain the nickel cermet.

The water-soluble, heat-decomposable salts of zirconyl, yttrium and nickel used in order to prepare the solution in the step (a) of the present process can be selected from among the salts of carboxy acids, or nitrate salts. Particularly suitable salts are zirconyl nitrate, zirconyl acetate, yttrium acetate, nickel nitrate and nickel acetate. The hydroxyacids suitable for use in the present invention are selected from among aliphatic or aromatic hydroxyacids, such as citric acid, lactic acid, glycolic acid, tartaric acid and mandelic acid. Of these, citric acid is preferred.

Suitable aminoacids are glycine and alanine. For the intended purpose, a poly(acrylic acid) can also be used.

Advantageously, aqueous solutions of zirconyl, yttrium and nickel salts are prepared, in which the relative ratios of the same salts are such as to have, in the nickel cermet obtained as the end product, from 35 to 70% by weight of nickel metal and from 65 to 30% by weight of zirconia stabilized with from 5 to 20 mol of yttria per each 100 mol of zirconia. The amount of organic hydroxyacid or aminoacid may furthermore be comprised within the range of from 2 to 4 mol per each mol of zirconium, yttrium and nickel metals. Under these conditions, the pH of the solution will normally be comprised within the range of from 2 to 5.

The solution can be prepared by dissolving in water the salts and the organic hydroxyacid, operating at room temperature, or favouring the solubilization by operating at higher temperatures. The order of addition of the reactants is not critical; however, forming an aqueous solution of the organic hydroxyacid and adding to said solution the salts of zirconyl, yttrium and nickel, is preferable.

According to the present invention, from the resulting solution water is removed, in the step (b) of the process, by operating under such temperature conditions as to prevent, or substantially prevent, any decomposition phenomena. In particular, said water removal can be carried out by evaporating water under vacuum, at a temperature not higher than about 80° C., by working, e.g., on a rotational evaporator.

According to an alternative operating way, water is removed by means of a spray-drying technique, by feeding the solution, with a concentration of from about 5 to about 30% (by weight/weight), in a finely subdivided form, to an apparatus for co-current or counter-current spray-drying with an inert gas, such as nitrogen, or air.

In general, the gas stream entering the spray dryer should have a temperature comprised within the range of from 150° C. to 300° C., preferably of from 180° C. to 200° C., and the leaving stream should preferably have a temperature of the order of from 90° C. to 200° C., preferably of from 130° C. to 170° C. In any case, from the drying step a crumbly, porous solid, generally of green-ochre colour—according to the temperature values used—will be obtained.

According to the present invention, the solid material obtained in that way is submitted to calcination, in the step (c) of the present process, by operating at high temperatures and in an oxidizing atmosphere. In particular, suitable calcination temperatures are generally comprised within the range of from 800° C. to 1000° C., and the calcination times should generally be comprised within the range of from 1 to 10 hours. According to a preferred form of practical embodiment, the calcination is carried out at temperatures of the order of 900° C., for a time of from 3 to 5 hours. The oxidizing atmosphere can be constituted by oxygen, air, or oxygen-enriched air. By operating under these conditions, from the solid material the combustible or decomposable fraction is removed, and the formation of the oxides of the metals present is caused. Surprisingly, it was observed that such a solid material consists of two distinct phases of nickel oxide and zirconia stabilized in the cubic form with yttria, with a phase distribution at a lower level than 1 $\mu$m.

This solid material is submitted to treatment with hydrogen, in the step (d) of the process, in order to reduce nickel oxide into nickel metal, and obtain the nickel cermet. In particular, the reduction is carried out by bringing the calcined solid material into contact with hydrogen gas, operating at temperatures comprised within the range of from 20° C. to 1000° C., in order to obtain a complete, or substantially complete, reduction of nickel oxide into nickel metal. Useful reduction times are of the order of from 1 to 3 hours.

In this way, the nickel cermet according to the present invention is obtained, which generally contains 35-70% by weight of a metal nickel phase and 65-30% by weight of a zirconia phase stabilized in the cubic form with yttria, and displaying the other characteristics, as reported hereinabove.

According to a further aspect thereof, the present invention relates to a solid oxide fuel cell (SOFC) characterized in that it comprises, as its anode, the nickel cermet with the characteristics reported hereinabove.

In particular, such an anode can be obtained by applying, according to known techniques, the nickel cermet of the present invention to a solid electrolyte of zirconia stabilized with yttria.

According to a particular form of embodiment of the solid electrolyte, the powder of metal oxides obtained after calcination in the step (c) of the process is applied, followed by the reduction, in situ, of nickel oxide into nickel metal.

The following experimental examples are given for the purpose of better illustrating the present invention.

EXAMPLE 1

In 330 ml of demineralized water, 100.07 g of citric acid monohydrate ($C_6H_8O_7 \cdot H_2O$ is dissolved at room temperature, and then 15.605 g of zirconyl nitrate hydrate $ZrO(NO_3)_2 \cdot xH_2O$ (zirconium content 32.71% by weight), 4.332 g of yttrium acetate tetrahydrate $Y(CH_3COO)_3 \cdot 4H_2O$ (26.8% by weight of yttrium) and 25.46 g of nickel nitrate hexahydrate $Ni(NO_3)_2 \cdot 6H_2O$ (20.18% by weight of nickel) are dissolved.

The solution is charged to a rotational evaporator and the solvent is evaporated off by operating at 70° C. and 74 mmHg. 146 g of a crumbly, porous solid residue of green colour is collected.

The solid is calcined in a muffle at 900° C. for 4 hours, under a flowing air stream. A 16.38 g of a solid material is collected which, on analysis by powder X-ray diffraction, is constituted by nickel oxide and zirconia stabilized with yttria, without other detectable crystalline phases. The nickel content in the solid product is 35.14% by weight.

The calcined solid is furthermore submitted to an X-ray mapping (STEM) which allows the distribution of the crystalline phases present in the sample, to be examined at submicronic level.

It is thus determined that nickel oxide is uniformly distributed, at a lower level than 1 $\mu$m, throughout the matrix of zirconia stabilized with yttria.

The calcined solid material is submitted to reduction by means of TPR (Thermal Programmed Reduction) technique. More particularly, 50 mg of sample, with particle size comprised within the range of from 20 to 40 mesh, is charged to a tubular quartz reactor and is exposed to a hydrogen stream flowing at a flowrate of 2.2 ml/minute., diluted in 17 ml/minute of helium (purity of gases 99.999%).

The sample is heated by means of a tubular furnace, using a linear thermal ramp of 10° C./minute, from 30° to 900° C. The effluent stream from the reactor is analysed by a quadrupolar mass spectrometer. The results of the reduction test are reported in Table I.

The hydrogenated sample is submitted to tests of hydrogen chemisorption by means of the pulsed technique.

From such test, the values are obtained of % nickel dispersion; of specific surface-area, as $m^2/g$ of nickel; of specific surface-area, as $m^2/g$ of cermet; and of coated surface-area, as % of total surface-area. These data are reported in Table II.

EXAMPLE 2

In 250 ml of demineralized water, 38.8 g of citric acid monohydrate ($C_6H_8O_7 \cdot H_2O$) is dissolved at room temperature, and then 3.91 9 of zirconyl nitrate hydrate $ZrO(NO_3)_2 \cdot xH_2O$ (zirconium content 32.71% by weight), 1.08 g of yttrium acetate tetrahydrate Y(CH$_3$COO)$_3$.4H$_2$O (26.8% by weight of yttrium) and 12.73 g of nickel nitrate hexahydrate Ni(NO$_3$)$_2$.6H$_2$O (20.18% by weight of nickel) are dissolved.

The solution is charged to a rotational evaporator and the solvent is evaporated off by operating at 70° C. and 74 mmHg. 56.55 g of a crumbly, porous solid residue of green colour is collected, which is calcined in a muffle at 900° C. for 4 hours, under a flowing air stream. 5.73 g of a solid material is collected which, on analysis by powder X-ray diffraction, is constituted by nickel oxide and zirconia stabilized with yttria, without other detectable crystalline phases. The nickel content in the solid product is 44.7% by weight.

The calcined solid is furthermore submitted to an X-ray mapping (STEM) which allows the distribution of the crystalline phases present in the sample, to be examined at submicronic level.

It is thus determined that nickel oxide is uniformly distributed, at a lower level than 1 μm, throughout the matrix of zirconia stabilized with yttria.

A sample of 50 mg of the calcined solid material, with particle size comprised within the range of from 20 to 40 mesh, is treated with hydrogen under the same conditions of Example 1. The results of the test are reported in Table I.

EXAMPLE 3

In 250 ml of demineralized water, 27.07 g of citric acid monohydrate (C$_6$H$_8$O$_7$.H$_2$O) is dissolved at room temperature, and then 1.95 g of zirconyl nitrate hydrate ZrO(NO$_3$)$_2$.xH$_2$O (zirconium content 32.71% by weight), 0.54 g of yttrium acetate tetrahydrate Y(CH$_3$COO)$_3$.4H$_2$O (26.8% by weight of yttrium) and 8.54 g of nickel nitrate hexahydrate Ni(NO$_3$)$_2$.6H$_2$O (20.18% by weight of nickel) are dissolved.

The weight of the solution is adjusted at 500 g by means of the addition of distilled water. The resulting solution is sent to a spray dryer operating with an entering gas flow with the temperature of 215° C. and a leaving gas flow with the temperature of 150° C. 38.1 g of a crumbly, porous solid residue of green colour is collected, which is calcined in a muffle at 900° C. for 4 hours, under a flowing air stream. 3.78 9 of a solid material is collected which, on analysis by powder X-ray diffraction, is constituted by nickel oxide and zirconia stabilized with yttria, without other detectable crystalline phases. The nickel content in the solid product is 55.70% by weight.

The calcined solid is furthermore submitted to an X-ray mapping (STEM) which allows the distribution of the crystalline phases present in the sample, to be examined at submicronic level.

It is thus determined that nickel oxide is uniformly distributed, at a lower level than 1 μm, throughout the matrix of zirconia stabilized with yttria.

A sample of 50 mg of the calcined solid material, with particle size comprised within the range of from 20 to 40 mesh, is treated with hydrogen under the same conditions of Example 1. The results obtained from this test are reported in Table I.

A sample of 0.4548 g of hydrogenated solid material is submitted to chemisorption tests as described in Example 1, and the results are reported in Table II.

TABLE I

| Example No. | T(°C.) of reduction beginning | T(°C.) of reduction end | T(°C.) at which reduction rate is maximal |
|---|---|---|---|
| 1 | 322 | 454 | 398 |
| 2 | 288 | 468 | 398 |
| 3 | 305 | 498 | 405 |

TABLE II

| Example No. | Dispersion (Ni %) | Specific surface-area, m$^2$/g of Ni | Specific surface-area, m$^2$/g of solid | Coated surface, % |
|---|---|---|---|---|
| 1 | 1.4903 | 9.9278 | 3.4886 | 21.05 |
| 2 | 0.5122 | 3.4121 | 1.900 | 18.55 |
| 3 | 0.8708 | 5.808 | 2.7670 | 19.60 |

We claim:
1. A nickel cermet consisting essentially of 35–70% by weight of a metallic nickel phase dispersed in 65–30% by weight of a zirconia phase stabilized in the cubic form with yttria, said phases, on X-ray diffraction analysis, being distinct and homogeneously distributed at a level lower than 1 μm, and said nickel cermet, when subjected to a hydrogen chemisorption test by means of a pulsed technique, showing a percent dispersion of nickel of from 0.2 to 2.0 and a specific surface-area within the range of from 2 to 12 m$^2$/g of nickel and of from 1 to 4 m$^2$/g of cermet.

2. A process for preparing a nickel cermet comprising the steps of:
 (a) preparing an aqueous solution containing water-soluble, heat-decomposable zirconyl, yttrium and nickel salts, and an organic hydroxyacid or aminoacid, or a poly(acrylic acid);
 (b) removing water from the solution prepared in step (a) in the absence or substantial absence of decomposition phenomena, to obtain a porous solid material;
 (c) calcining the porous solid separated in step (b) under oxidizing conditions to form a solid material containing two distinct phases of nickel oxide and of zirconia stabilized in the cubic form with yttria, with a phase distribution at a level lower than 1 μm; and
 (d) reducing the nickel oxide in said solid material to metallic nickel to obtain the nickel cermet.

3. The process according to claim 2, wherein the water-soluble, heat-decomposable zirconyl, yttrium and nickel salts are selected from salts of carboxy acids and nitrate salts.

4. The process according to claim 3, wherein said salts are zirconyl nitrate, zirconyl acetate, yttrium acetate, nickel nitrate and nickel acetate.

5. The process according to claim 2, wherein the organic hydroxyacids are selected from citric acid, lactic acid, glycolic acid, tartaric acid and mandelic acid and the organic aminoacids are selected from glycine and alanine.

6. The process according to claim 5, wherein the hydroxyacid is citric acid.

7. The process according to any one of claim 2 to 6, wherein in step (a) the relative amounts of zirconyl, yttrium and nickel salts is such as to provide in the nickel cermet obtained as the end product, from 35 to 70% by weight of metallic nickel and from 65 to 30% by weight of zirconia stabilized with from 5 to 20 mol of yttria per 100 mol of zirconia, the amount of organic hydroxyacid or aminoacid being from 2 to 4 mol per mol of zirconia, yttrium and nickel metals, and the pH of the solution being within the range of from 2 to 5.

8. The process according to claim 2, wherein in step (b) water is removed from the solution under vacuum at a temperature not higher than about 80° C. or by spray-drying.

9. The process according to claim 2, wherein in step (c) the calcination is carried out at a temperature of from 800° C. to 1000° C., for a period of from 1 to 10 hours in an atmosphere of oxygen, air, or oxygen-enriched air.

10. The process according to claim 9, wherein said calcination is carried out at about 900° C. for a period of from 3 to 5 hours.

11. The process according to claim 2, wherein in step (d) the reduction is carried out by contacting the calcined solid material with hydrogen gas, at a temperature of from 20° C. to 1000° C.

12. A solid oxide fuel cell comprising a cathode of lanthanum manganite; a solid electrolyte of a mixture of yttria and zirconia, and an anode of a nickel cermet, said nickel cermet consisting essentially of 35-70% by weight of a metallic nickel phase dispersed in 65-30% by weight of a zirconia phase stabilized in the cubic form with yttria, said phases, on X-ray diffraction analysis, being distinct and homogeneously distributed at a level lower than 1 $\mu$m, and said nickel cermet, when subjected to a hydrogen chemisorption test by means of a pulsed technique, showing a percent dispersion of nickel of from 0.2 to 2.0 and a specific surface-area within the range of from 2 to 12 $m^2$/g of nickel and of from 1 to 4 $m^2$/g of cermet.

* * * * *